US012608915B2

(12) United States Patent (10) Patent No.: US 12,608,915 B2

Nagao (45) Date of Patent: Apr. 21, 2026

(54) IMAGE PROCESSING APPARATUS AND IMAGE PROCESSING METHOD

(71) Applicant: CANON KABUSHIKI KAISHA, Tokyo (JP)

(72) Inventor: Atsushi Nagao, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 314 days.

(21) Appl. No.: 18/240,388

(22) Filed: Aug. 31, 2023

(65) Prior Publication Data

US 2024/0078789 A1 Mar. 7, 2024

(30) Foreign Application Priority Data

Sep. 6, 2022 (JP) .................................. 2022-141518

(51) Int. Cl.
   *G06V 10/771* (2022.01)
   *G06T 7/70* (2017.01)
(52) U.S. Cl.
   CPC .............. *G06V 10/771* (2022.01); *G06T 7/70* (2017.01); *G06T 2207/20081* (2013.01); *G06T 2207/20084* (2013.01); *G06V 2201/07* (2022.01)
(58) Field of Classification Search
   CPC .............. G06V 10/771; G06V 2201/07; G06V 10/454; G06V 10/82; G06V 40/103; G06T 7/70; G06T 2207/20081; G06T 2207/20084; G06T 7/00; G06T 7/73

USPC ......................................................... 382/190
See application file for complete search history.

(56) References Cited

U.S. PATENT DOCUMENTS

| 12,001,893 | B1 * | 6/2024 | Khaitan | .................... | G06F 9/52 |
| 2018/0122098 | A1 * | 5/2018 | Wang | ........................ | G06T 7/75 |
| 2018/0360313 | A1 * | 12/2018 | Zhang | ..................... | G06T 7/337 |
| 2020/0226786 | A1 * | 7/2020 | Fitzgibbon | .............. | G06T 7/251 |
| 2022/0051398 | A1 * | 2/2022 | Watanabe | ............. | G06T 7/0012 |

FOREIGN PATENT DOCUMENTS

| JP | 2022-510417 A | 1/2022 |
| WO | 2020/115579 A1 | 6/2020 |

* cited by examiner

*Primary Examiner* — Jerome Grant, II
(74) *Attorney, Agent, or Firm* — Carter, DeLuca & Farrell LLP

(57) ABSTRACT

An image processing apparatus that estimates a vector representing a relative positional relationship between parts of a subject using machine learning is disclosed. The image processing apparatus, using a convolutional neural network (CNN), detects, from an image, a first part and a second part of a specific subject, and a relative position vector from the first part to the second part. The CNN is configured to generate a feature map indicating an approximate direction of the relative position vector. The image processing apparatus trains the CNN using a loss function pertaining to the relative position vector and a loss function pertaining to the feature map.

10 Claims, 6 Drawing Sheets

101 — CPU

102 — ROM

103 — RAM

STORAGE UNIT — 104

INPUT UNIT — 105

DISPLAY UNIT — 106

COMMUNICATION UNIT — 107

100

IMAGE OBTAINMENT UNIT — 201

205 — PARAMETER OBTAINMENT UNIT

ESTIMATION UNIT — 202

DETECTION UNIT — 203

CONNECTION UNIT — 204

FIG. 4

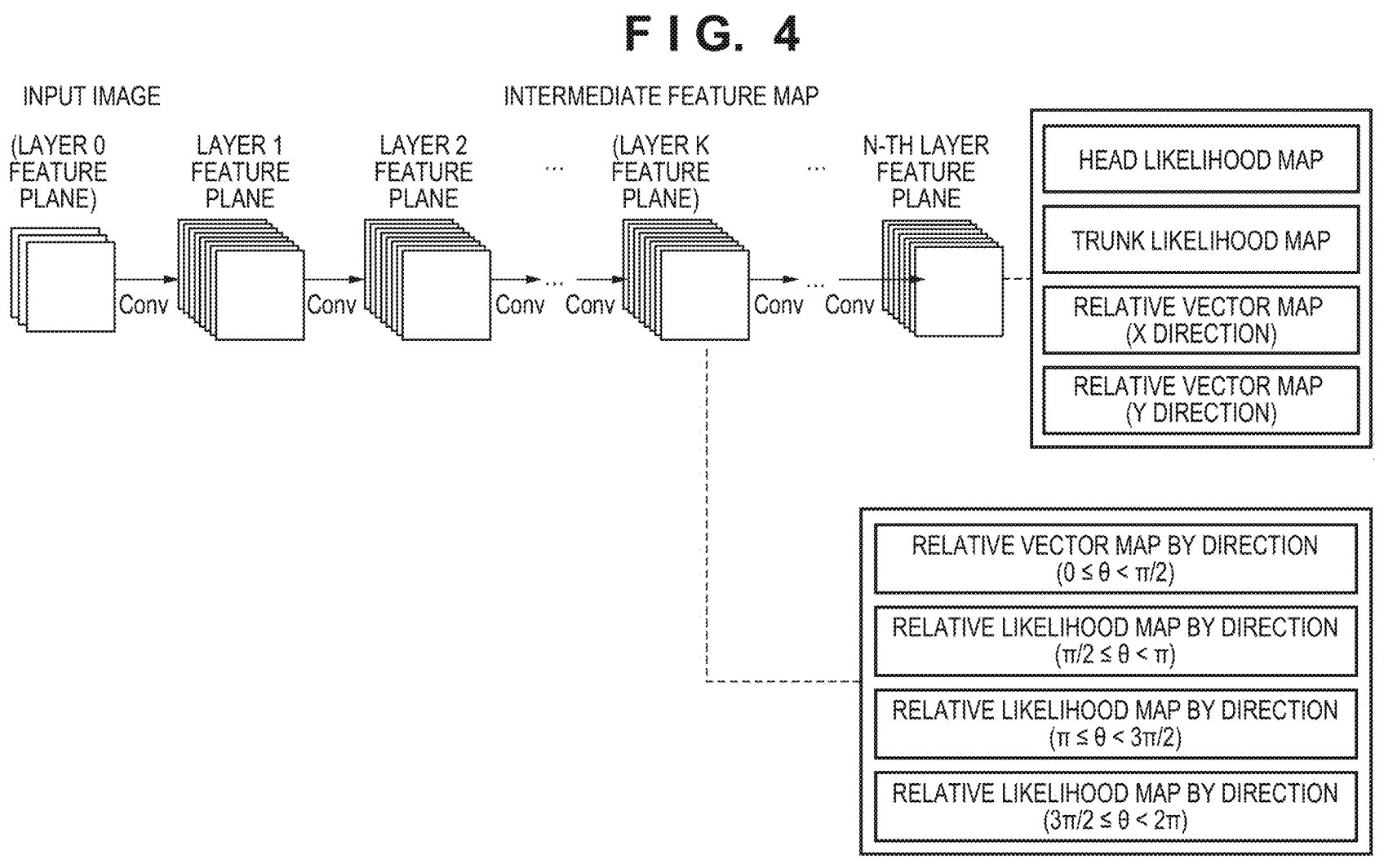

INPUT IMAGE (LAYER 0 FEATURE PLANE)

Conv

LAYER 1 FEATURE PLANE

Conv

LAYER 2 FEATURE PLANE

Conv    Conv

INTERMEDIATE FEATURE MAP (LAYER K FEATURE PLANE)

Conv    Conv    ...    Conv

N-TH LAYER FEATURE PLANE

HEAD LIKELIHOOD MAP

TRUNK LIKELIHOOD MAP

RELATIVE VECTOR MAP (X DIRECTION)

RELATIVE VECTOR MAP (Y DIRECTION)

RELATIVE VECTOR MAP BY DIRECTION $(0 \le \theta < \pi/2)$

RELATIVE LIKELIHOOD MAP BY DIRECTION $(\pi/2 \le \theta < \pi)$

RELATIVE LIKELIHOOD MAP BY DIRECTION $(\pi \le \theta < 3\pi/2)$

RELATIVE LIKELIHOOD MAP BY DIRECTION $(3\pi/2 \le \theta < 2\pi)$

F I G. 6
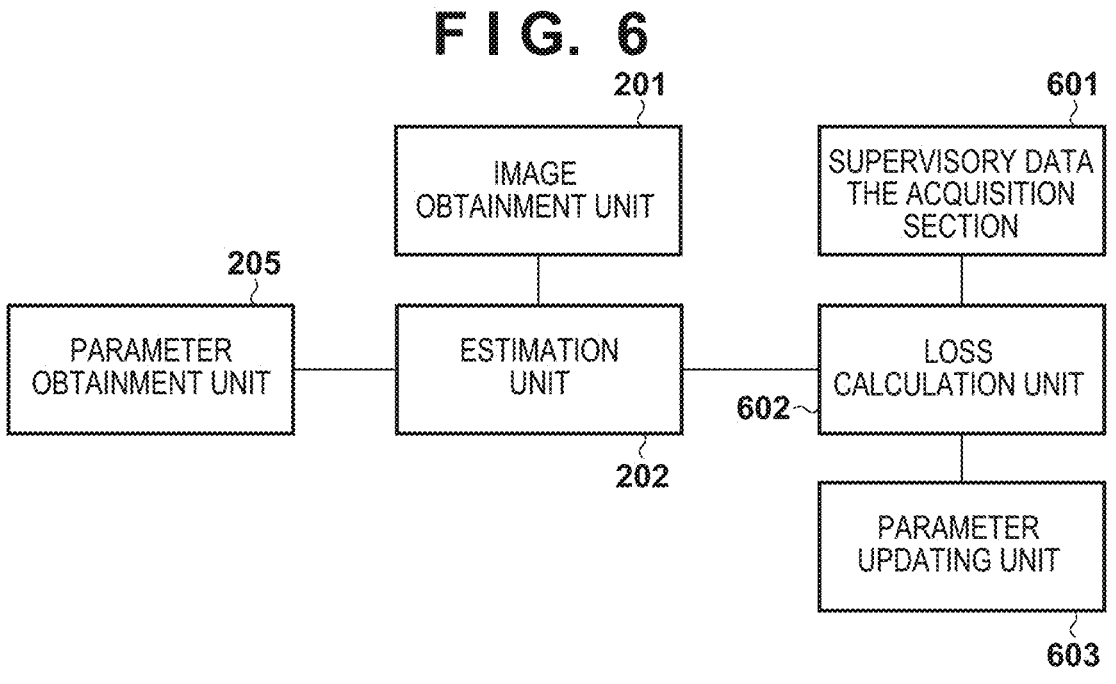
F I G. 7
START
OBTAIN IMAGE ~ S701
OBTAIN SUPERVISORY DATA ~ S702
FEATURE MAP GENERATION PROCESSING ~ S703
CALCULATE LOSS VALUE ~ S704
UPDATE OPERATING PARAMETER ~ S705
END

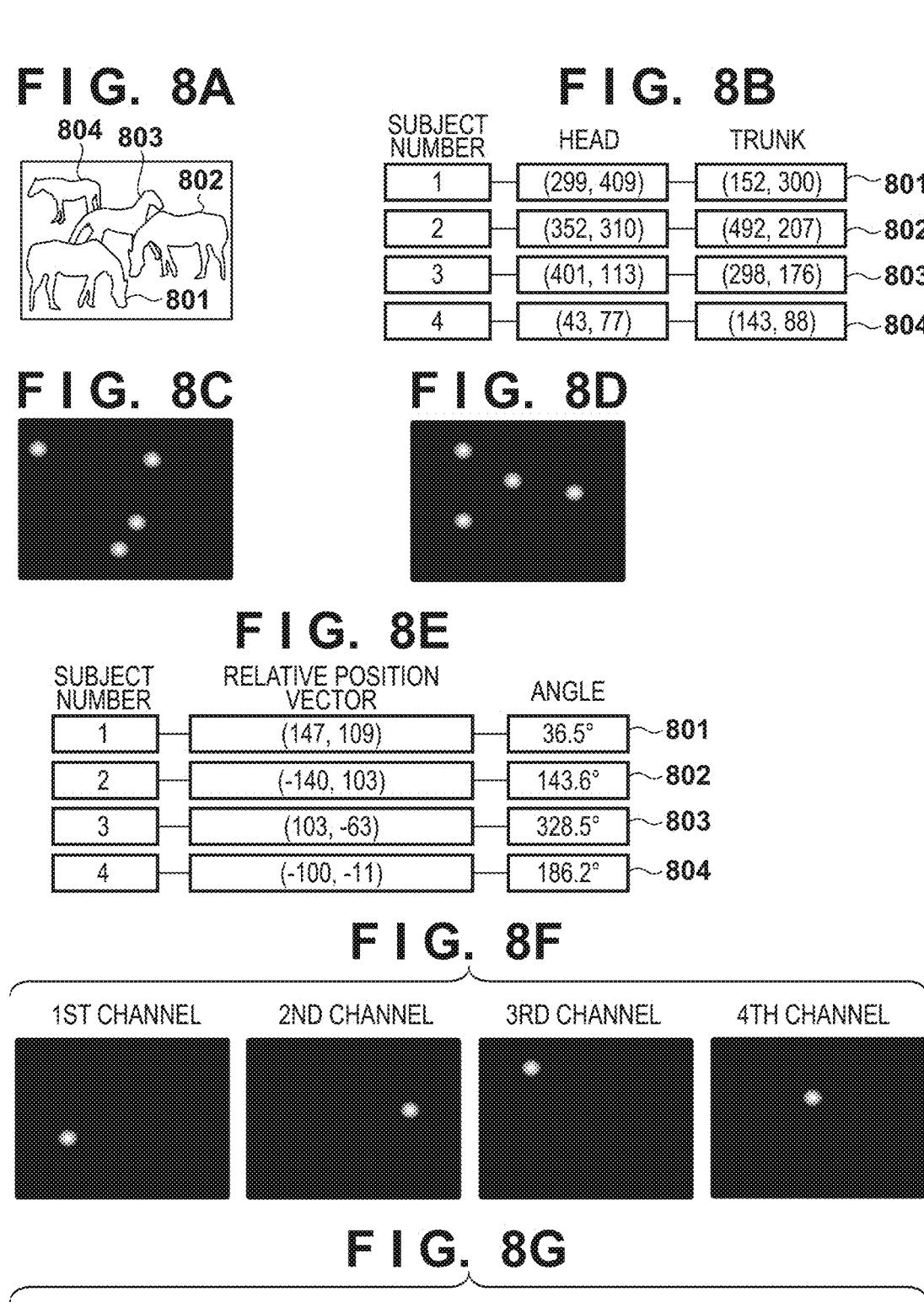
F I G. 8A
F I G. 8B
| SUBJECT NUMBER | HEAD | TRUNK | |
|----------------|------|-------|---|
| 1 | (299, 409) | (152, 300) | ~801 |
| 2 | (352, 310) | (492, 207) | ~802 |
| 3 | (401, 113) | (298, 176) | ~803 |
| 4 | (43, 77) | (143, 88) | ~804 |
F I G. 8C
F I G. 8D
F I G. 8E
| SUBJECT NUMBER | RELATIVE POSITION VECTOR | ANGLE | |
|----------------|--------------------------|-------|---|
| 1 | (147, 109) | 36.5° | ~801 |
| 2 | (-140, 103) | 143.6° | ~802 |
| 3 | (103, -63) | 328.5° | ~803 |
| 4 | (-100, -11) | 186.2° | ~804 |
F I G. 8F
| 1ST CHANNEL | 2ND CHANNEL | 3RD CHANNEL | 4TH CHANNEL |
|-------------|-------------|-------------|-------------|
F I G. 8G

IMAGE PROCESSING APPARATUS AND IMAGE PROCESSING METHOD

BACKGROUND OF THE INVENTION

Field of the Invention

The present invention relates to an image processing apparatus and an image processing method, and particularly relates to a technique for detecting a subject.

Description of the Related Art

Using a neural network to estimate, from an image, the positions of joints and two-dimensional vector fields associated with the connections between joints from an image is known as a technique for detecting the posture of a body having joints (Japanese Patent Laid-Open No. 2022-510417).

However, the estimation of a two-dimensional vector field is a regression problem, and it is therefore not easy to train the neural network properly. There has thus been room for improvement in the accuracy of two-dimensional vector field estimation.

SUMMARY OF THE INVENTION

The present invention provides in one aspect an image processing apparatus and an image processing method capable of accurately estimating a vector representing a relative positional relationship between parts of a subject using machine learning.

According to an aspect of the present invention, there is provided an image processing apparatus comprising: one or more processors that execute a program stored in a memory and thereby function as: a detection unit that, using a convolutional neural network (CNN), detects, from an image, a first part and a second part of a specific subject, and a relative position vector from the first part to the second part; a training unit that trains the detection unit, wherein the CNN is configured to generate a feature map indicating an approximate direction of the relative position vector, and the training unit trains the detection unit using a loss function pertaining to the relative position vector and a loss function pertaining to the feature map.

According to another aspect of the present invention, there is provided an image processing method executed by an image processing apparatus, the image processing apparatus including a detection unit that, using a convolutional neural network (CNN), detects, from an image, a first part and a second part of a specific subject, and a relative position vector from the first part to the second part, the image processing method comprising: generating, by the CNN, a feature map indicating an approximate direction of the relative position vector; and training the detection unit using a loss function pertaining to the relative position vector and a loss function pertaining to the feature map.

According to a further aspect of the present invention, there is provided a non-transitory computer-readable medium that stores a program, which when executed by a computer, causes the computer to function as an image processing apparatus comprising: a detection unit that, using a convolutional neural network (CNN), detects, from an image, a first part and a second part of a specific subject, and a relative position vector from the first part to the second part; a training unit that trains the detection unit, wherein the CNN is configured to generate a feature map indicating an approximate direction of the relative position vector, and the training unit trains the detection unit using a loss function pertaining to the relative position vector and a loss function pertaining to the feature map.

Further features of the present invention will become apparent from the following description of exemplary embodiments (with reference to the attached drawings).

BRIEF DESCRIPTION OF THE DRAWINGS

FIG. 4 is a diagram illustrating an example of a CNN constituting an estimation unit according to the embodiment.

FIG. 6 is a block diagram illustrating an example of the functional configuration of the image processing apparatus when executing training processing according to the embodiment.

FIG. 7 is a flowchart pertaining to the training processing according to the embodiment.

FIGS. 8A to 8G are diagrams illustrating the training processing according to the embodiment.

DESCRIPTION OF THE EMBODIMENTS

Figures 1, 2:
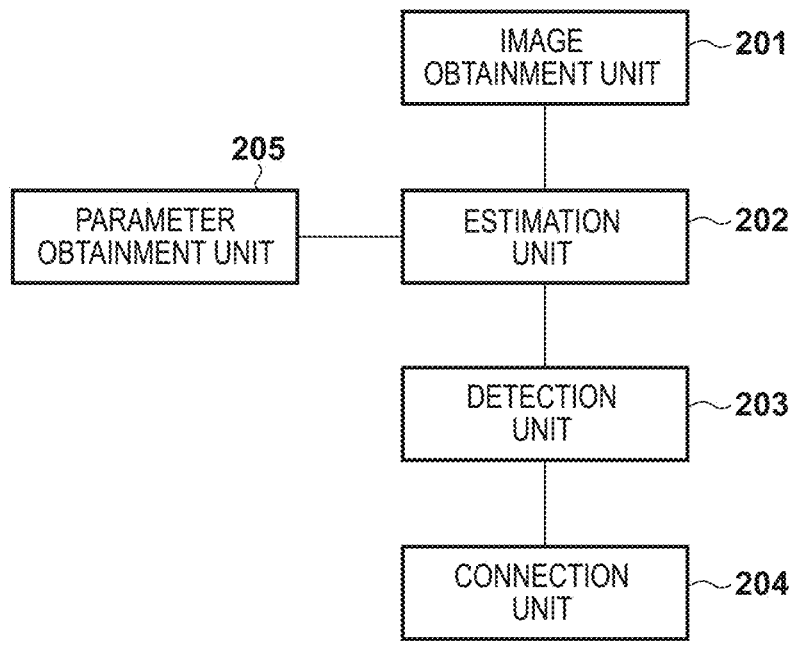
FIG. 1 is a block diagram illustrating an example of the hardware configuration of an image processing apparatus according to an embodiment.
FIG. 2 is a block diagram illustrating an example of the functional configuration of the image processing apparatus when executing detection processing according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a block diagram illustrating an example of the hardware configuration of an image processing apparatus 100 according to the present embodiment.

A CPU 101 executes various types of processing (described later) by executing a control program stored in a ROM 102 or a storage unit 104, using a RAM 103 as a work memory. The storage unit 104 includes a storage device, such as a hard disk drive (HDD), a solid state drive (SSD), or the like, that stores programs (firmware, an OS, applications, and the like) executed by the CPU 101, as well as various types of data.

"Input unit 105" is a generic term for a user-operable input device provided in the image processing apparatus 100, such as a keyboard, a mouse, buttons, switches, a touch panel, or the like.

A display unit 106 is a display, and displays a screen (GUI) provided by the OS or application being executed by the CPU 101. The display unit 106 may be a touch screen.

A communication unit 107 is a communication interface compliant with at least one wired and/or wireless communication standard. The image processing apparatus 100 can communicate with an external device, such as an image capturing device, through the communication unit 107.

To facilitate descriptions and understanding, FIG. 1 illustrates the CPU 101 as controlling all processing by the image processing apparatus 100 by executing programs. However, for at least some of the image processing described later, the CPU 101 may use other hardware to execute the processing. For example, according to the details of the processing, the CPU 101 can use hardware capable of executing processing faster than the CPU 101. Such hardware includes ASICs, Digital Signal Processors (DSPs), Graphic Processing Units (GPUs), Neural Processing Units (NPUs), and the like. For example, the processing described below which uses a neural network may be executed by an NPU instead of by the CPU 101, and the processing results may be communicated to the CPU 101.

The image processing apparatus 100 can be implemented by a computer device such as a personal computer, tablet, a smartphone, or the like, for example. The image processing apparatus 100 may also have an image capturing function.
Subject Detection Processing First, subject detection processing using trained operating parameters will be described, followed by the training processing for the operating parameters used in the subject detection processing.

In the detection processing, the trained operating parameters are used to detect a plurality of parts of a specific subject from an input image, and associate parts of the same subject. It is assumed here that a human is the specific subject, and the head and trunk are detected as the plurality of parts. However, the specific subject is not limited to a human, and may be another type of subject, such as an animal. The specific subject is furthermore not limited to living organisms, and may be any desired type of subject for which individual parts can be detected.

FIG. 2 is a block diagram representing the image processing apparatus 100, which executes the subject detection processing, as function blocks. To simplify the descriptions and facilitate understanding, each function block is assumed hereinafter to be implemented by the CPU 101 executing a program. However, at least one function block may be realized by hardware separate from the CPU 101. Note that a single function block may be implemented by a plurality of pieces of hardware, and a single piece of hardware may implement a plurality of function blocks.

An image obtainment unit 201 obtains an image in which the specific subject appears. Note that the image obtainment unit 201 may obtain an image captured by an image capturing device connected to the image processing apparatus, or may obtain an image stored in the storage unit 104.

An estimation unit 202 generates various types of feature maps by applying processing to the image obtained by the image obtainment unit 201 using operating parameters obtained by a parameter obtainment unit 205. The estimation unit 202 generates a head likelihood map indicating the head position, a trunk likelihood map indicating the trunk position, a relative vector map, and a likelihood map for a specific direction as feature maps for the specific subject in the image. Each feature map will be described later.

The present embodiment assumes that the estimation unit 202 generates the various types of feature maps by applying, to the image, processing which uses machine learning, and specifically a convolutional neural network (CNN). It is further assumed that the operating parameters obtained by the parameter obtainment unit 205 are the coupling weight coefficients between the layers of the CNN used by the estimation unit 202. As such, the estimation unit 202 executes various types of processing using machine learning by setting and using the operating parameters in the CNN.

A detection unit 203 detects the trunk position and the head position of the specific subject, and a relative position vector from the trunk to the head, using the feature maps generated by the hidden layers (convolution layers, pooling layers, and the like) of the CNN in the estimation unit 202.

A connection unit 204 associates the trunk and the head of the same specific subject using a result of the detection by the detection unit 203.

The parameter obtainment unit 205 reads out trained operating parameters from the storage unit 104 and provides those parameters to the estimation unit 202.

Figure 3:
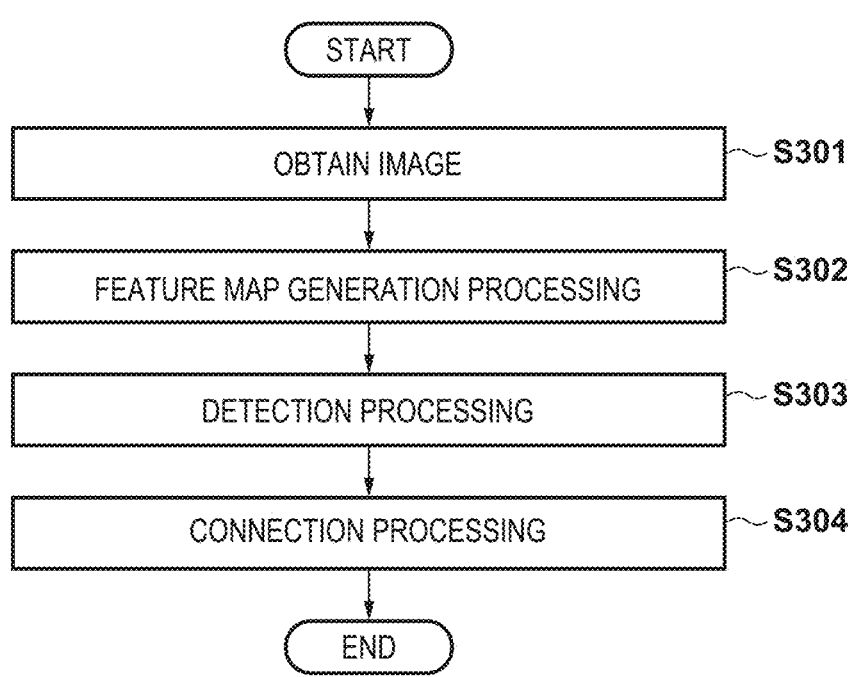
FIG. 3 is a flowchart pertaining to the detection processing according to the embodiment.

Subject detection operations by the image processing apparatus 100 will be described next with reference to the flowchart in FIG. 3 and the block diagram in FIG. 2. The processing executed by each function block illustrated in FIG. 2 is executed by the hardware (the CPU 101 or other hardware) that implements that function block. These operations may be executed in response to a user instruction made through the input unit 105, or may be executed in response to another given event, for example. Additionally, these operations can be executed as part of functions provided by an image processing application running on the image processing apparatus 100, for example.

The subject detection processing according to the present embodiment is processing for detecting at least two parts of a predetermined subject for detection (the specific subject), and then associating the detected parts on a subject-by-subject basis.

Figures 5A, 5B, 5C, 5D, 5E:
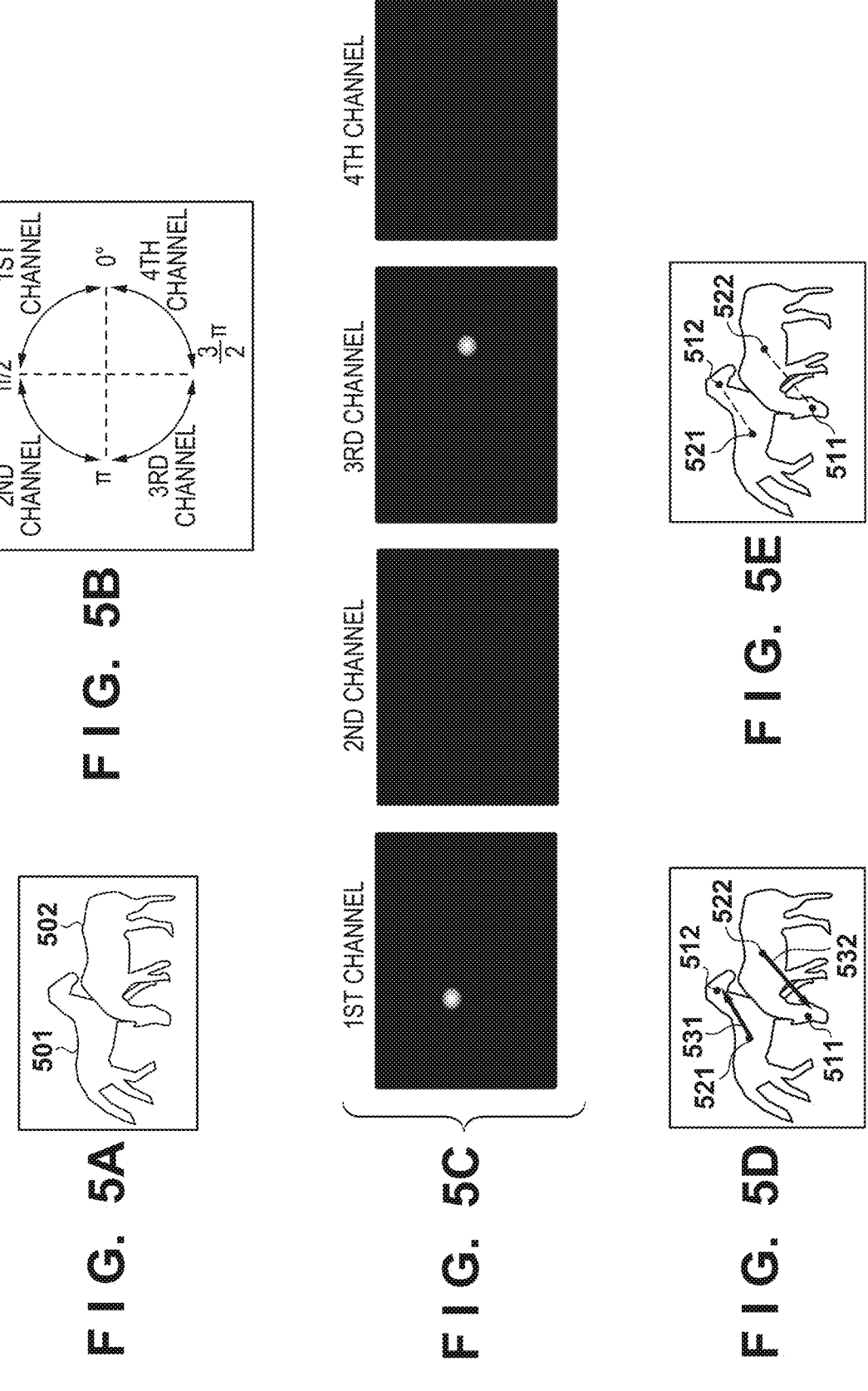
FIGS. 5A to 5E are diagrams illustrating the detection processing according to the embodiment.

In step S301, the image obtainment unit 201 obtains one frame's worth of an input image (which may be a still image or a moving image). Assume here that an image in which horses 501 and 502, which are a plurality of specific subjects, are overlapping, as illustrated in FIG. 5A, has been obtained.

In step S302, the estimation unit 202 inputs the input image to the CNN, and generates the various feature maps (the head likelihood map, the trunk likelihood map, the relative vector map, and the likelihood map for a specific direction) in the hidden layers. The trained operating parameters (coupling weight coefficients between layers) from the parameter obtainment unit 205 are set in the CNN.

FIG. 4 is a diagram schematically illustrating the configuration of the CNN used by the estimation unit 202 and the operations for generating each feature map. In FIG. 4, "Conv" indicates processing by a convolution layer. A feature plane of an i-th layer ($2 \leq i \leq N$) is generated by a convolution operation that takes the feature plane of an (i−1)-th layer as an input. The convolution operation on the input image may be an operation that applies a spatial filter (also called a "kernel") to the input image while shifting the position, for example. In addition to the convolution operation, the processing by the convolution layer can include pooling, applying an activation function, and the like.

A predetermined four channels among the feature planes of an N-th layer, which is the final layer, are output as the head likelihood map, the trunk likelihood map, and the relative vector map (two channels in the X and Y directions), respectively. Additionally, a predetermined four channels among the feature planes of a K-th layer ($1 < K < N$), which is an intermediate layer, are output as the likelihood map for a specific direction. The generation of the likelihood map for a specific direction corresponds to classification processing for roughly estimating (in units of $\pi/2$, here) the direction (angle) of a relative vector from the trunk to the head, and is therefore easier than regression processing for estimating the relative vector itself. However, obtaining the approximate direction of the relative position vector can increase the accuracy of the association between the trunk and the head of the same subject.

When the operating parameters (the coupling weight coefficients between the layers of the CNN) are properly trained through training processing (described later), the head likelihood map has a peak likelihood at the coordinates corresponding to the head position of the specific subject appearing in the input image. Likewise, the trunk likelihood map has a peak likelihood at the coordinates corresponding to the trunk position of the specific subject appearing in the input image.

The relative vector map is a two-channel map including maps of an X direction component and a Y direction component of the relative position vector from the trunk to the head. The map of the X direction component has the X direction value of the relative position vector from the trunk to the head of the same subject at the coordinates corresponding to the trunk position of the specific subject. The map of the Y direction component has the Y direction value of the relative position vector from the trunk to the head of the same subject at the coordinates corresponding to the trunk position of the specific subject.

The likelihood map for a specific direction is a four-channel map. The map of a k-th channel shows a range for each channel where an angle $\theta_i$ of the relative position vector from the trunk to the head is $(k-1)\pi/2 \leq \theta_{ii}$. The likelihood map for a specific direction is a feature map that shows, for each trunk, the approximate direction in which the corresponding head is present (the approximate direction of the relative position vector) as an angular range of a predetermined size.

FIG. 5C illustrates an example of a likelihood map for a specific direction generated by the estimation unit 202 for the input image illustrated in FIG. 5A. The map in the first channel has a likelihood peak for the horse 501, and the map in the third channel has a likelihood peak for the horse 502. Accordingly, the likelihood map for a specific direction illustrated in FIG. 5C indicates that the probability that an angle $\theta$ formed by the relative position vector from the trunk to the head is 0° to 90° for the horse 501, and 180° to 270° for the horse 502, is high. The estimation unit 202 outputs the generated maps to the detection unit 203.

In step S303, the detection unit 203 detects the head position of the specific subject from the head likelihood map among the maps generated by the estimation unit 202. The detection unit 203 detects the coordinates corresponding to the likelihood peak in the head likelihood map as the head position, for example.

Specifically, the detection unit 203 detects the likelihood peak in the head likelihood map. For example, the detection unit 203 detects a pixel, among the pixels constituting the map, having a value (likelihood) that is higher than all the surrounding pixels as a candidate pixel. The surrounding pixels may be the pixels above, below, to the left, to the right, and diagonally adjacent, for example. Then, the detection unit 203 detects the candidate pixel, among the detected candidate pixels, having a value (likelihood) exceeding a predetermined threshold as a peak pixel. The detection unit 203 then takes the image coordinates of the peak pixel as the head position of the specific subject. If the operating parameters are properly trained, the head likelihood map generated from the input image illustrated in FIG. 5A will have a value (likelihood) exceeding the threshold for the pixels of the head positions of the horses 501 and 502, respectively.

The detection unit 203 also detects the trunk position of the specific subject from the trunk likelihood map, in the same manner as when detecting the head position.

The detection unit 203 also obtains the relative position vector to the head of the same subject for each detected trunk from the relative vector map (X direction and Y direction). If the operating parameters are properly trained, in the relative vector map, the pixel values of the coordinates corresponding to the trunk position of the subject will be the X direction component and the Y direction component of the relative position vector from that trunk to the head of the same subject.

Accordingly, the detection unit 203 obtains the pixel values corresponding to the coordinates of individual trunk positions detected using the trunk likelihood map, for the relative vector map in each channel. The detection unit 203 then takes the vector having two pixel values for the X direction component and the Y direction component as the relative position vector for the head of the same subject corresponding to the detected trunk.

Taking the detected i-th trunk position as $$\left(x_i^B, y_i^B\right)$$

and the relative vector map as $M_u(x, y)$, $M_v(x, y)$, the relative position vector $(u_i, v_i)$ for the i-th trunk is as follows.

$$u_i = M_u\left(x_i^B, y_i^B\right)$$
$$v_i = M_v\left(x_i^B, y_i^B\right)$$

FIG. 5D illustrates an example of the results of detecting the head position, the trunk position, and the relative position vector for the input illustrated in FIG. 5A. 511 and 512 indicate the detected head positions. 521 and 522 indicate the detected trunk positions. 531 indicates the relative position vector at the trunk position 521, and 532 indicates the relative position vector at the trunk position 522. The detection unit 203 outputs the detected head position, trunk position, and relative position vector to the connection unit 204.

In step S304, the connection unit 204 associates the trunk and the head of the same subject using the trunk position, head position, and relative position vector detected by the detection unit 203 in step S303.

First, the connection unit 204 finds a matching score of the association for all combinations of detected trunks and heads. The connection unit 204 finds a matching score MatchingScore(i, j) between an i-th trunk and a j-th head through the following formula. Note that i and j are integers of 1 or more and less than or equal to a total number.

$$\text{MatchingScore}(i, j) = \left(x_i^B + u_i - x_j^H\right)^2 + \left(y_i^B + v_i - y_j^H\right)^2$$

The matching score obtained in this manner has a value which decreases as the matching score increases. Accordingly, of the matching scores found for all the combinations, selecting the combinations in order from the lowest matching score makes it possible to associate the trunk and the head of the same subject. FIG. 5E illustrates an example of the result of the association for the image illustrated in FIG.

5A. The trunk 521 and the head 512 of the horse 501 are correctly associated with each other, as are the trunk 522 and the head 511 of the horse 502.

Through the processing of steps S301 to S304, the image processing apparatus 100 can detect the head position and the trunk position of a specific subject appearing in an input image and associate the head position and the trunk position of the same subject.

Variation on Step S304

When the relative position vector is correctly detected, the trunk and the head of the same subject can be associated with each other through the above-described processing. However, sometimes the relative position vector cannot be detected correctly. The likelihood map for a specific direction can be referenced to suppress situations where the association is made incorrectly, when the relative position vector is incorrect.

The processing of step S304 when referencing the likelihood map for a specific direction will be described next. First, the connection unit 204 obtains a reliability Coef(i) for the relative position vector $(u_i, v_i)$ of the i-th trunk. The reliability can be obtained based on the consistency between the likelihood map for a specific direction and the relative position vector.

The connection unit 204 determines the channel where a peak should be present in the likelihood map for a specific direction based on the angle $\theta_i$ formed by the relative position vector $(u_i, v_i)$ and the i-th trunk position. Assume, for example, that the angle $\theta_i$ formed by the relative position vector to the head, corresponding to the i-th trunk, is $6/\pi$. In this case, the first channel of the likelihood map for a specific direction is expected to have a peak at the i-th trunk position $$\left(x_i^B, y_i^B\right).$$

The connection unit 204 references the value of the i-th trunk position $$\left(x_i^B, y_i^B\right)$$

for each channel in the likelihood map for a specific direction. The connection unit 204 then takes a value greater than a predetermined threshold as a peak. The connection unit 204 determines that the reliability of the relative position vector is high (the relative position vector can be trusted) if the channel of the likelihood map for a specific direction in which the pixel at the coordinates of the trunk position has a value taken as a peak is only the channel corresponding to the angle $\theta$ of the relative position vector. On the other hand, the connection unit 204 determines that the reliability of the relative position vector is low (the relative position vector cannot be trusted) if the pixel at the coordinates of the trunk position has a value taken as a peak is present in a channel of the likelihood map for a specific direction which is different from the channel corresponding to the angle $\theta$ of the relative position vector.

The connection unit 204 sets the reliability Coef(i) to a first value (e.g., 0) when the relative position vector is determined to have a high reliability, and sets the reliability Coef(i) to a second value (e.g., Go) when the reliability is determined to be low. The second value need not actually be infinity, but may be a flag (e.g., 1) that disables the matching score MatchingScore.

Next, the connection unit 204 finds the matching score MatchingScore(i, j) of the association for all combinations of detected trunks and heads through the following formula. This is the same as the previous formula, except that Coef(i) is added.

$$\text{MatchingScore } (i, j) = \left(x_i^B + u_i - x_j^H\right)^2 + \left(y_i^B + v_i - y_j^H\right)^2 + Coef(i)$$

In this manner, the matching score reflecting the reliability Coef(i) takes on a lower value as the matching score increases. The matching score is infinity for combinations in which the reliability of the relative position vector is low. Accordingly, of the matching scores found for all the combinations, selecting the combinations in order from the lowest matching score makes it possible to associate the trunk and the head of the same subject based on a relative position vector having a high reliability. Note that when Coef(i) is a value indicating a low reliability, that combination may be excluded.

Training Processing

The training processing for the operating parameters used by the estimation unit 202 will be described next. FIG. 6 is a block diagram representing the image processing apparatus 100, which executes the training processing for the operating parameters, as function blocks. Function blocks that are the same as in FIG. 2 are given the same reference signs, and will not be described.

To simplify the descriptions and facilitate understanding, each function block is assumed hereinafter to be implemented by the CPU 101 executing a program. However, at least one function block may be realized by hardware separate from the CPU 101. Note that a single function block may be implemented by a plurality of pieces of hardware, and a single piece of hardware may implement a plurality of function blocks.

The operations by which the estimation unit 202 uses the operating parameters obtained from the parameter obtainment unit 205 to generate the various feature maps for the input image supplied from the image obtainment unit 201 are the same as those described with reference to FIG. 4. When executing the training processing, the estimation unit 202 outputs the various feature maps generated to a loss calculation unit 602.

A supervisory data obtainment unit 601 obtains supervisory data corresponding to the input image. The supervisory data will be described in detail later. The supervisory data may be obtained by reading out supervisory data stored in the storage unit 104 in advance, or by being input by a user through the input unit 105.

The loss calculation unit 602 calculates a loss value based on the various feature maps generated by the estimation unit 202 and the supervisory data obtained by the supervisory data obtainment unit 601. The method for calculating the loss value will be described later.

A parameter updating unit 603 updates the operating parameters such that the loss value decreases, based on the loss value calculated by the loss calculation unit 602. The parameter updating unit 603 overwrites the location from which the operating parameters were obtained (e.g., the storage unit 104) with the updated operating parameters.

Operations performed in the operating parameter training processing by the image processing apparatus 100 will be described with reference to the flowchart in FIG. 7 and the block diagram in FIG. 6. The processing executed by each function block illustrated in FIG. 7 is executed by the hardware (the CPU 101 or other hardware) that implements that function block. The hardware implementing the function blocks illustrated in FIG. 7 functions as training means. These operations may be executed in response to a user instruction made through the input unit 105, or may be executed in response to another given event, for example. Additionally, these operations can be executed as part of functions provided by an image processing application running on the image processing apparatus 100, for example.

The operating parameter training processing is processing for optimizing the operating parameters such that the various feature maps described above can be generated properly by the estimation unit 202 (a CNN, in the present embodiment) when using an image in which a specific subject appears as an input image. The processing of steps S701 to S705 described hereinafter (a training loop) is repeatedly executed until an ending condition is satisfied (e.g., the loss drops below a threshold).

Here, a training dataset is assumed to be stored in advance in a location which can be accessed from the image obtainment unit 201 and the supervisory data obtainment unit 601 (e.g., the storage unit 104). The training dataset is a plurality of combinations of training input images, in which a plurality of specific subjects appear, and supervisory data (correct answer data) corresponding to the input images.

In step S701, the image obtainment unit 201 obtains one frame's worth of a training input image (which may be a still image or a moving image). Assume here than an image in which horses 801 to 804, which are specific subjects, are overlapping, as illustrated in FIG. 8A, has been obtained as the training input image. Note that the specific subjects do not absolutely have to be overlapping, and may instead be adjacent or in close proximity to each other in the image.

In step S702, the supervisory data obtainment unit 601 obtains the supervisory data corresponding to the input image. In the present embodiment, the supervisory data is a list of head positions and trunk positions for each specific subject appearing in the input image, as illustrated in FIG. 8B. In FIG. 8B, the i-th trunk position $$\left(x_i^B, y_i^B\right)$$

and the i-th head position $$\left(x_i^H, y_i^H\right)$$

are the trunk position and the head position of the i-th specific subject. The supervisory data obtainment unit 601 outputs the obtained supervisory data to the loss calculation unit 602.

In step S703, using the operating parameters obtained by the parameter obtainment unit 205, the estimation unit 202 uses the CNN to generate the feature maps (the trunk likelihood map, the head likelihood map, the relative vector map, and the likelihood map for a specific direction) from the input image. The estimation unit 202 outputs the generated feature maps to the loss calculation unit 602.

In step S704, the loss calculation unit 602 calculates the loss values to be used to update the operating parameters, using the feature maps and the supervisory data. The loss calculation unit 602 performs linear combination on the loss values for each feature map to calculate the loss values to be used to update the operating parameters. An example of the loss calculation for each feature map will be described hereinafter.

Loss Value Calculation for Head Likelihood Map

First, the loss calculation unit 602 generates a correct value ($\widehat{M_C^H}$) for the head likelihood map from the head position in the supervisory data, using the following formula.

$$\widehat{M_C^H}(x, y) = \sum_{x,y} G\left(x, y, x_i^H, y_i^H, \sigma\right)$$

Here, $$\left(x_i^H, y_i^H\right)$$

represents the i-th head position in the supervisory data.

The function $G(x, y, c_x, c_y, \sigma)$ is a two-dimensional Gaussian function having a kernel size $\sigma$ centered on a point $(c_x, c_y)$. The correct value ($\widehat{M_C^H}$) has a peak value at the head position, and decreases with distance from the head position. FIG. 8C illustrates the correct value for the head likelihood map corresponding to the input image illustrated in FIG. 8A.

Next, the loss calculation unit 602 calculates the loss $$L_C^H$$

between the head likelihood map $$M_C^H$$

generated by the estimation unit 202 and the correct value ($\widehat{M_C^H}$) for the head likelihood map generated from the supervisory data, through the following formula.

$$L_C^H = \sum_{x,y} CrossEntropy\left(Sigmoid\left(M_C^H(x, y)\right), \widehat{M_C^H}(x, y)\right)$$

Here, Sigmoid(x) is the following sigmoid function $$Sigmoid(x) = 1/(1 + e^{-x})$$

CrossEntropy(x,t) is the following cross-entropy loss function.

$$CrossEntropy(x,t) = -t \log x - (1-t)\log(1-x)$$

Loss Value Calculation for Trunk Likelihood Map

The loss calculation unit 602 calculates the loss for the trunk likelihood map in the same manner as with the loss for the head likelihood map. In other words, the loss calculation unit 602 generates the correct value ($\widehat{M_C^B}$) for the trunk likelihood map through the following formula.

$$\widehat{M_C^B}(x, y) = \sum_{x,y} G\left(x, y, x_i^B, y_i^B, k\right)$$

Here, $$\left(x_i^B, y_i^B\right)$$

represents the i-th trunk position in the supervisory data.

The correct value ($\widehat{M_C^B}$) has a peak value at the trunk position, and decreases with distance from the trunk position. FIG. 8D illustrates the correct value for the trunk likelihood map corresponding to the input image illustrated in FIG. 8A.

Next, the loss calculation unit 602 calculates the loss $$L_C^B$$

between the trunk likelihood map $$M_C^B$$

generated by the estimation unit 202 and the correct value ($\widehat{M_C^B}$) for the trunk likelihood map calculated from the supervisory data, through the following formula.

$$L_C^B = \sum_{x,y} CrossEntropy\left(Sigmoid\left(M_C^B(x, y)\right), \widehat{M_C^B}(x, y)\right)$$

The sigmoid function and the cross-entropy loss function in the formula are the same as those described above.

Loss Value Calculation for Relative Vector Map

The loss calculation unit 602 calculates a loss $L_{UV}$ for the relative vector map $M_u$, $M_v$ as follows. In an ideal relative vector map $M_u$, $M_v$, the pixel value at the trunk position is a directional component of the relative position vector to the head corresponding to that trunk. Accordingly, the loss calculation unit 602 calculates the loss $L_{UV}$ of the relative vector map as the square error between the pixel value of the trunk position $$\left(x_i^B, y_i^B\right)$$

and the values of the relative position vector direction components $M_u$, $M_v$. In other words, the loss $L_{UV}$ can be calculated through the following formula.

$$L_{UV} = \sum_i \left\{M_u\left(x_i^B, y_i^B\right) - u_i\right\}^2 + \left\{M_v\left(x_i^B, y_i^B\right) - v_i\right\}^2$$

Here, $u_i$, $v_i$ are directional components of the correct value of the relative position vector for the i-th subject. $u_i$, $v_i$ can be calculated through the following formula using the head position $$\left(x_i^H, y_i^H\right)$$

and the trunk position $$\left(x_i^B, y_i^B\right)$$

in the supervisory data.

$$u_i = x_i^H - x_i^B$$

$$v_i = y_i^H - y_i^B$$

Loss Value Calculation for Likelihood Map for Specific Direction

The loss calculation unit 602 calculates the loss value for the likelihood map for a specific direction as follows. First, the loss calculation unit 602 generates a correct value ($\widehat{M_D}$) for the likelihood map for a specific direction.

The correct value ($\widehat{M_D}$) for the likelihood map for a specific direction is a four-channel map, as described with reference to FIGS. 5B and 5C. Each channel corresponds to a difference range for the angle $\theta_i$ formed by the relative position vector ($u_i$, $v_i$). The k-th channel of the correct value ($\widehat{M_D}$) for the likelihood map for a specific direction has a peak at the trunk position having a relative position vector within the angular range corresponding to that channel. When $\Omega_k = k\pi/2$, a target subject for which the angle $\theta_i$ formed by the relative position vector satisfies $\Omega_{(k-1)} \leq \theta_i < \Omega_k$ has a peak in the k-th channel. Accordingly, the loss calculation unit 602 calculates the correct value ($\widehat{M_D}$) through the following formula.

$$\hat{M}_{D,k}(x, y) = \sum_i G\left(x, y, x_i^B, y_i^B, \sigma\right) \text{ if } \Omega_{k-1} \leq \theta_i < \Omega_k \text{ else } 0$$

Next, the loss calculation unit 602 calculates a loss $L_D$ between a trunk likelihood map $M_D$ generated by the estimation unit 202 and the correct value ($\widehat{M_D}$) through the following formula.

$$L_D = \sum_k \sum_{x,y} CrossEntropy\left(Sigmoid(M_{D,k}(x, y)), \hat{M}_{D,k}(x, y)\right)$$

FIG. 8E illustrates the coordinates of the relative position vector calculated from the supervisory data corresponding to FIG. 8A and the angle $\theta_i$ formed by the relative position vector. FIG. 8F illustrates the correct value ($\widehat{M_D}$) of the generated likelihood map for a specific direction.

The present embodiment assumes that the angular range of 360° ($2\pi$) which the angle $\theta_i$ formed by the relative position vector can take is divided every 90° ($\pi/2$), and that the number of channels in the likelihood map for a specific direction is four. However, the number of divisions for the angular range is not limited to four, and may be any desired integer greater than or equal to 2. The angular range also need not be uniform.

The loss calculation unit 602 calculates a final loss value $L_{Total}$ by performing linear combination on all the calculated loss values, as indicated by the following formula.

$$L_{Total} = \lambda_H L_c^H + \lambda_B L_c^B + \lambda_{UV} L_{UV} + \lambda_D L_D$$

The coefficients $\lambda_H$, $\lambda_B$, $\lambda_{UV}$, $\lambda_D$ applied to each loss value for the linear combination difference may be predetermined fixed values. Alternatively, the values may be based on the number of instances of training at that point in time. For example, $\lambda_H = \lambda_B = \lambda_{UV} = 0$ may be used when the number of instances of training is less than a predetermined value. In this case, the operating parameters are trained based only on the loss $L_D$ for the likelihood map for a specific direction. This corresponds to performing the training using the likelihood map for a specific direction preferentially over the other maps. This makes it possible to perform processing using the information of the likelihood map for a specific direction, e.g., determine the reliability of the relative vector, with high accuracy from an early stage.

In step S704, the parameter updating unit 603 updates the operating parameters based on the loss value calculated by the loss calculation unit 602. The operating parameters can be updated based on error back propagation, e.g., Momentum or Adam, or another publicly-known method based on stochastic gradient descent (SGD). The parameter updating unit 603 records the updated operating parameters in the storage unit 104.

When the update of the operating parameters is complete, the training processing ends if the predetermined ending condition is satisfied, and if not, the sequence returns to step S701 again to continue the training.

The ending condition may be, for example, a number of times the operating parameters are updated, or that the loss value has fallen below a predetermined value.

Performing the processing of steps S701 to S705 makes it possible to train the operating parameters (the coupling weight coefficients of the CNN) used in the detection processing.

Variation on Step S704

In step S704 of the training processing described above, the loss for the likelihood map for a specific direction was calculated for the entire area of each channel. However, a non-target area in which the loss is not calculated may be set for each channel.

The non-target area can be set, for example, in the vicinity of the trunk position of a non-target subject to be determined for each channel. The condition for the i-th subject to be a non-target subject for the k-th channel is that the angle $\theta_i$ formed by the relative position vector is not within the angular range of the k-th channel. Specifically, when $\delta$ represents a margin (at least 0), the angle $\theta_i$ formed by the relative position vector is in the range $[\Omega_{(k-1)} - \delta, \Omega_{(k-1)}]$ and $[\Omega_k, \Omega_k + \delta]$. The margin $\delta$ can be set as desired, but $\delta = \pi/8$ in the present embodiment.

Specifically, through the following formula, the loss calculation unit 602 generates a target determination map $(\widehat{F_D})$ for determining whether an area is a non-target area, for each channel.

$$\hat{F}_{D,k}(x, y) = \sum_i Circle\left(x, y, x_i^B, y_i^B, \sigma\right)$$

if $\Omega_{k-1} - \delta \le \theta_i < \Omega_{k-1}$ or $\Omega_k \le \theta_i < \Omega_k + \delta$ else 1

Here, the function Circle(x, y, $c_x$, $c_y$, $\sigma$) is a function that is 0 inside a circle of a radius $\sigma$ centered on a point ($c_x$, $v_y$), and is 1 otherwise. In the target determination map $(\widehat{F_D})$, an area having a value of 0 means the area is a non-target for which no loss calculation is required.

FIG. 8G illustrates an example of the target determination map $(\widehat{F_D})$ generated by the loss calculation unit 602 for the input image illustrated in FIG. 8A. The horse 804, which is the specific subject, is excluded from the loss calculation for the angular range in which the angle $\theta_i$ formed by the relative position vector is the second channel. Therefore, in the second channel of the target determination map, the value of the circular area centered on the trunk position of the subject 804 is 0 (indicated by black in the drawing).

The calculation of the loss $L_D$ for the likelihood map for a specific direction in which the non-target area has been excluded based on the target determination map $(\widehat{F_D})$ can be expressed through the following formula.

$$L_D = \sum_k \sum_{x,y} CrossEntropy\left(Sigmoid(M_{D,k}(x, y)), \hat{M}_{D,k}(x, y)\right)\hat{F}_{D,k}(x, y)$$

Using the target determination map makes it possible to perform robust training for supervisory data in which the angle $\theta$ formed by the relative position vector is close to the boundary of the angular range.

As described above, according to the present embodiment, a likelihood map for a specific direction, which roughly classifies the angle of a relative position vector between different parts of a specific subject, is generated as a feature map. Then, using the likelihood map for a specific direction to make associations between parts makes it possible to accurately associate parts belonging to the same subject even when the estimation accuracy of the relative position vector is low. Training the likelihood map for a specific direction is also easier than training a relative position vector map (a relative vector map). Accordingly, prioritizing the training of the likelihood map for a specific direction over the training of the relative vector map makes it possible to improve the efficiency of the training of the final relative vector map.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-141518, filed on Sep. 6, 2022, which is hereby incorporated by reference herein in its entirety.

What is claimed is:

1. An image processing apparatus comprising:
one or more processors that execute a program stored in a memory and cause the image processing apparatus to:
detect, using a convolutional neural network (CNN), from an image, a first part and a second part of a specific subject, and a relative position vector from the first part to the second part; and
train the CNN,
wherein:
the CNN is configured to generate a feature map indicating an approximate direction of the relative position vector,
the CNN is trained using a loss function pertaining to the relative position vector and a loss function pertaining to the feature map,
the feature map is indicated by an angular range having a predetermined magnitude as the approximate direction of the relative position vector, and
the feature map has a channel for each of the angular ranges, and each of the channels indicates a likelihood that the second part corresponding to the first part is present.

2. The image processing apparatus according to claim 1, wherein the program further includes causing the image processing apparatus to:
train the CNN further using a loss function pertaining to a position of the first part and a loss function pertaining to a position of the second part.

3. The image processing apparatus according to claim 1, wherein the program further includes causing the image processing apparatus to:
train the CNN by prioritizing the loss function pertaining to the feature map over any other loss function(s) when a number of instances of training is lower than a predetermined value.

4. The image processing apparatus according to claim 1, wherein the program further includes causing the image processing apparatus to:
set an area for which calculation of a loss function is not performed in the feature map.

5. The image processing apparatus according to claim 4, wherein the program further includes causing the image processing apparatus to:
set an area for which the calculation of the loss function is not performed in the feature map of a channel corresponding to an angular range that does not coincide with the direction of the relative position vector.

6. The image processing apparatus according to claim 5, wherein the program further includes causing the image processing apparatus to:

set, as the area for which the calculation of a loss function is not performed, a predetermined range centered on a first part different from the first part corresponding to the relative position vector, of the feature map of the channel corresponding to the angular range that does not coincide with the direction of the relative position vector.

7. The image processing apparatus according to claim 1, wherein the program further includes causing the image processing apparatus to:
associates part of a same subject based on the relative position vector detected, for the first part and the second part detected.

8. The image processing apparatus according to claim 7, wherein the program further includes causing the image processing apparatus to:
determine the reliability of the relative position vector based on a consistency with the approximate direction indicated by the feature map, and associates parts of a same subject based on the reliability of the relative position vector.

9. An image processing method executed by an image processing apparatus, the image processing apparatus including a convolutional neural network (CNN), that detects, from an image, a first part and a second part of a specific subject, and a relative position vector from the first part to the second part, the image processing method comprising:
generating, by the CNN, a feature map indicating an approximate direction of the relative position vector; and
training the CNN using a loss function pertaining to the relative position vector and a loss function pertaining to the feature map,
wherein the feature map is indicated by an angular range having a predetermined magnitude as the approximate direction of the relative position vector, and
wherein the feature map has a channel for each of the angular ranges, and each of the channels indicates a likelihood that the second part corresponding to the first part is present.

10. A non-transitory computer-readable medium that stores a program, which when executed by a computer, causes the computer to function as an image processing apparatus and to execute an image processing method comprising:
using a convolutional neural network (CNN), detects, from an image, a first part and a second part of a specific subject, and a relative position vector from the first part to the second part; and
training the CNN,
wherein;
the CNN is configured to generate a feature map indicating an approximate direction of the relative position vector,
the CNN is trained using a loss function pertaining to the relative position vector and a loss function pertaining to the feature map,
the feature map is indicated by an angular range having a predetermined magnitude as the approximate direction of the relative position vector, and
the feature map has a channel for each of the angular ranges, and each of the channels indicates a likelihood that the second part corresponding to the first part is present.

* * * * *